Jan. 25, 1966  H. W. TRECHSEL  3,231,769
SIGNAL GENERATOR
Filed Aug. 9, 1961

INVENTORS.
Leif Eric deNeergaard, Deceased
BY Northern Trust Co., Executor
Hans W. Trechsel
BY Parker & Carter
Attorneys.

United States Patent Office 3,231,769
Patented Jan. 25, 1966

3,231,769
SIGNAL GENERATOR
Hans W. Trechsel, 4217 Barby Lane, Madison, Wis., and Leif Eric de Neergaard, deceased, late of Chicago, Ill., by The Northern Trust Co., executor, 50 S. La Salle St., Chicago, Ill.
Filed Aug. 9, 1961, Ser. No. 130,738
12 Claims. (Cl. 310—156)

This invention relates to a phase analog signal generator which translates either linear or rotational movement into a proportional phase change in an electrical signal.

Although the device of the present invention has many uses, it can advantageously be used to instantly and continuously detect and convert any displacement of a machine tool element, such as carriages, slides, spindles, platens and the like, into electrical phase displacement which is an index from instant to instant of the precise displacement of the element relative to its supporting structure. Such phase shifting signal generators are of great value in the so-called servo systems where the rate, direction and magnitude of displacement of one or more slideable or rotatable work members of machine or fabricating tools are automatically controlled by displacement data storage members, such as cams or recorded tapes or films. The signal put out by the generator of this invention may be recorded on a tape, for example, to be used subsequently in controlling other machine elements.

A primary object of the present invention is to provide a phase shifting type of signal generator in which there is no physical contact between the generating elements.

Another purpose is to provide a signal generator of the type described which is extremely compact.

Another purpose is to provide an improved type of magnetic storage member which is used as one element of signal generator and which can be manufactured at a low cost.

Another purpose is to provide a signal generator which is effective to generate a cyclic signal regardless of whether a machine tool element, such as a carriage of a lathe, is stationary or moving with respect to another element, such as the bed of the lathe.

A further purpose is to provide a cyclic signal generator in which the use of gears, slip rings, brushes and similar wearing parts, are eliminated, thus materially increasing the life of the generating assembly, as well as increasing the accuracy of the generator and reducing maintenance to a minimum.

Other purposes will appear in the ensuing specification, drawings and claims.

Figure 1:
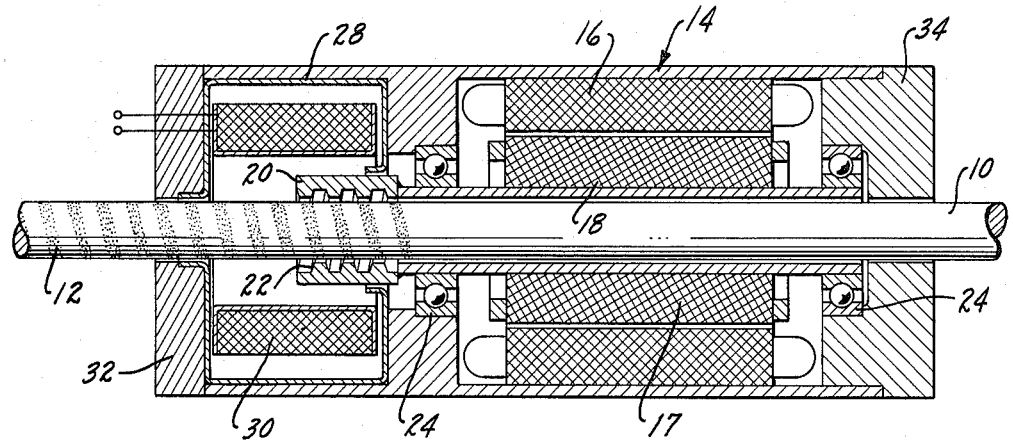
Figure 2:
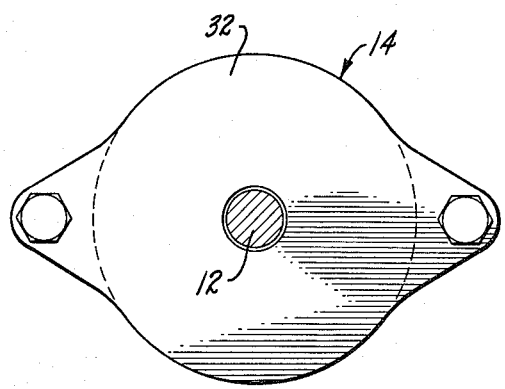

The invention is illustrated diagrammatically in the following drawings wherein:

FIGURE 1 is a section through the phase analog signal generator of this invention, and FIGURE 2 is an end view, from the left-hand side, of the signal generator of FIGURE 1.

In FIGURE 1, a meter element 10 is shown as a long slender rod, preferably of stainless steel, or any other material having high magnetic retentivity. The meter element serves as a source of energy for the signal generator as will be described hereinafter. Although the meter element is shown as a rod, it may also be a tube, and the term rod as used herein should be taken to include both a solid element of one material, a hollow tube, or a tube of one material positioned around a center of a different material. The meter element 10 has equally spaced areas of different magnetic flux density or differential flux emissive areas spaced along the length of the rod. Preferably, these areas are in the form of a magnetic thread 12 which is wound around the rod much as the thread on a bolt. The thread 12 may be a single-start or a multiple-start thread. Preferably, the magnetic thread 12 is recorded on the meter element by placing a north pole on one side of the element and a south pole on the opposite side, and thus helically moving the element past the poles.

In the use of the device shown, the meter element is attached to that portion of a machine tool whose movement relative to a stationary portion of the tool is to be measured. The meter rod may be used to measure linear movement, or it may be used as a resolver in which case it would be used to measure the angle through which a particular member has moved. The signal put out by the generator is primarily a position signal, as it indicates the relative position of a movable member from instant to instant.

A synchronous motor 14 includes a stator 16 and a rotor 17. The rotor 17 is mounted on a cylinder 18 which extends completely through the rotor and has a cylindrical element 20 fastened at one end. The cylindrical element 20, which may be termed a scanner, is preferably formed of Mumetal or a similar material having high permeability to low magnetic flux densities. The scanner 20 has an internal thread 22 to form alternate areas of different magnetic reluctance. The thread 22 may be a single-start or multiple-start thread depending on the type of thread used on the meter element. Preferably, the pitch of the thread 20 is the same as the pitch of the magnetic thread 12 on the meter rod. The cylinder 18 is supported in the motor structure by bearings 24 so that the cylinder may freely rotate with the rotor 17. The scanner 20 should be machined so that the air gap between the scanner and the meter rod is small.

Positioned around the scanner 20 is a cylindrical housing 28 which encloses a coil 30 formed of many fine turns of copper wire. The housing 28 is preferably Mumetal or any other similar material having high permeability to low magnetic flux densities. The housing of the synchronous motor is completed by two end covers 32 and 34 each of which have a generally central bore which receives the meter rod 10.

The use, operation and function of the invention are as follows:

Shown and described herein is an improved form of phase analog signal generator for use on a machine tool or the like in which the displacement of a meter rod, either linear displacement or rotational movement, will cause a change in phase in the output of the cyclic signal of the generator. The output of the generator continuously indicates the relative position of two members as distinguished from the step-by-step measurement of a digital system. Preferably, the generator includes a synchronous motor which may have two poles in which case if the generator is activated by a 60-cycle current, it would have a speed of sixty revolutions per second. Accordingly, the scanner 20 will be rotated at a speed of sixty revolutions per second and the alternate areas of high and low reluctance formed by the internal thread on the scanner will cut the lines of flux from the meter rod sixty times a second to generate a cyclic signal having a frequency of 60 cycles per second. The input of the generator and the output have the same frequency which may vary depending on the application. For example, 600 cycles per second is an advantageous frequency in some uses. Where higher frequencies are desired, a multiple start thread may be used on the meter element and on the scanner.

Preferably, the pitch of both the scanner and the meter rod are the same. The flux will vary as a sine wave as the threads of the scanner and meter rod move from exact registry to the point where the threads of the scanner are in registry with the unmagnetized areas. The threads on the scanner vary the air gap and thus increase and decrease the reluctance in the magnetic circuit. Although as shown in the drawings, the internal thread of the scanner 20 has alternate spaces, these spaces may be filled with a plastic, having high reluctance, to achieve the same effect. The plastic filling is advantageous as it prevents particles such as iron dust from getting caught within the threads of the scanner.

The meter element is preferably made from a stainless steel that has low permeability. Therefore, there is considerable flux leakage from the magnetized areas, which leakage flux constitutes the working flux for the generator.

The magnetic path of the generator includes the magnetic traces of the meter bar, the scanner 20 and the housing portion 28. The coil is positioned within the magnetic path such that changes in the flux caused by the rotating scanner, induce an alternating signal in the coil. As discussed earlier, either linear movement of the meter rod or rotational movement of the rod may cause a phase change in the signal induced in the coil 30. For example, if the meter rod is attached to a movable element on a machine tool, and it is desired to record the extent of movement of this element in relation to the bed of the machine tool, which is stationary, movement of the meter rod within the scanner will cause a phase change in the cyclic signal produced by the coil 30. In order words, as the meter rod moves back and forth within the scanner, there is additional relative movement between these two elements. This additional relative movement will cause a phase change, either a lagging change or a leading change, in the signal induced in the coil 30. This phase change results from the fact that either more or less magnetic lines of flux will be cut by the scanner due to the movement of the meter rod either left or right. Assuming the threads of the scanner move from left to right, as shown in the drawings, if the meter rod moves to the right, during a set interval of time, there will be fewer magnetic lines of flux cut by the threads of the scanner than if the meter rod was stationary. Similarly, if the meter rod moves to the left as shown in FIGURE 1, there will be more lines of magnetic flux cut by the scanner. Accordingly, it can be seen that minute movements of the meter rod will cause a change in phase of an electric signal, which change in phase is precisely proportional to the amount of movement.

Similarly, rotational movement of the meter rod will result in a phase change proportional to the angular movement of the rod. In this situation the signal generator acts as a resolver. In other words, if the meter rod rotates in one direction, there will be an increased number of lines of magnetic flux cut by the scanner whereas when the meter rod rotates in the opposite direction, fewer lines of magnetic flux will be cut in the same instant of time. Accordingly, the signal produced in the coil 30 will either lag or lead the signal produced when there is no movement of the meter rod.

As shown in the drawings, the source of the magnetic flux is a meter rod and the scanner 20 is internally threaded to cut the lines of flux of the rod. However, these elements may be reversed in that the machined thread may be placed on the meter rod and the magnetic thread may be placed on the inside of the scanner. It is also possible to use a rotating meter element and a stationary scanner. The result is the same.

Whereas the preferred form of the invention has been shown and described herein, it should be realized that there are many modifications, substitutions and alterations thereto within the scope of the following claims.

It is claimed:

1. A device for translating movement into phase change of an electrical signal including a meter element having a source of magnetic flux forming generally equally spaced areas of different magnetic flux density, a coil concentric with said meter element, and means forming a flux path between said meter element and coil, a scanner positioned around said meter element and means providing relative rotation between said meter element and said scanner at a predetermined generally constant rate, said scanner including means to repeatedly interrupt the flux in said path to generate a cyclic signal in said coil having a predetermined frequency, additional relative movement between said scanner and said meter element producing a phase change in said signal which is proportional to said movement.

2. A device for translating movement of a machine element into phase change of a cyclic signal including a cylindrical meter element having a source of magnetic flux forming generally equally spaced areas of different magnetic flux density, a coil concentric with said meter element, and means forming a flux path between said meter element and coil, a scanner and means to rotate it, said meter element being axially aligned with said scanner and extending within said scanner such that rotation of said scanner cuts the magnetic lines of flux coming from said meter element to thereby generate a cyclic signal having a predetermined frequency, additional relative movement between said meter element and said scanner producing a phase change in said signal which is proportional to said movement.

3. A device for translating movement of a machine element into phase change of a cyclic signal including a meter element and a scanner, one of which has a source of magnetic flux forming generally equally spaced areas of different magnetic flux density, the other having generally equally spaced areas of different reluctance, a coil concentric with said meter element, means defining a flux path between said meter element and coil, means providing relative rotation between said meter element and said scanner, said scanner being positioned about said meter element so that said areas of different reluctance continuously cut the lines of magnetic flux formed by said areas of different magnetic flux density to thereby generate a cyclic signal having a predetermined frequency, additional relative movement between said meter element and said scanner producing a phase change in said signal proportional to said movement.

4. The structure of claim 3 further characterized in that said areas of different magnetic flux density and said areas of different reluctance have the same spacing.

5. A device for translating movement of a machine element into phase change of a cyclic signal including a cylindrical meter element having a source of magnetic flux forming generally equally spaced differential magnetic flux emissive areas, a coil concentric with said meter element, and means defining a flux path between said meter element and coil, a scanner having generally equally spaced areas of differential reluctance, means to rotate said scanner, said meter element being axially aligned with said scanner and extending within said scanner such that rotation of said scanner cuts the magnetic lines of flux coming from said meter element to thereby generate a cyclic signal having a predetermined frequency, additional relative movement between said meter element and said scanner producing a phase change in said signal which is proportional to said movement.

6. A phase shifting signal generator including a meter rod having generally equally spaced differential flux emissive areas in the form of a permanently magnetized thread, a coil concentric with said rod, means defining a flux path between said meter rod and coil, a scanner and means to rotate it, said meter rod being axially aligned with said scanner and extending within said scanner such that rotation of said scanner cuts the magnetic lines of flux coming from said meter rod to thereby generate a cyclic signal having a predetermined frequency, additional relative movement between said meter element and said scanner producing a phase change in said signal which is proportional to said movement.

7. The structure of claim 6 further characterized in that said scanner has areas of differential reluctance which pass through the magnetic lines of flux formed by said meter rod.

8. The structure of claim 7 further characterized in that said areas of differential reluctance are in the form of an internal thread on said scanner.

9. The structure of claim 8 further characterized in that the pitch of said magnetic thread and the pitch of the thread of said scanner are the same.

10. A phase shifting signal generator including a meter rod having generally equally spaced differential magnetic flux emissive areas in the form of a permanently magnetized thread, a coil concentric with said meter rod, means forming a flux path between said rod and coil, a scanner and means to rotate it, said scanner having an internally threaded cylinder, said meter rod being axially aligned with said cylinder and extending within said cylinder such that rotation of said cylinder cuts the magnetic lines of flux coming from said meter rod to thereby generate a cyclic signal having a predetermined frequency, additional relative movement between said meter rod and said scanner producing a phase change in said signal which is proportional to said movement.

11. A device for translating movement of a machine element into phase change of a cyclic signal including a cylindrical meter element having a source of magnetic flux forming generally equally spaced differential magnetic flux emissive areas, a coil concentric with said meter element, and means forming a flux path between said coil and meter element, a scanner having generally equally spaced areas of differential reluctance, means for providing relative rotational movement between said scanner and meter element, said meter element extending within said scanner such that said relative rotation cuts the lines of flux coming from said meter element to thereby generate a cyclic signal having a predetermined frequency, additional relative movement between said meter element and said scanner producing a phase change in said signal which is proportional to said movement.

12. A device for translating movement of a machine element into phase change of a cyclic signal including a meter element and a scanner, one of which has a source of magnetic flux forming generally equally spaced areas of different magnetic flux density, the other having generally equally spaced areas of different reluctance, a coil concentric with said meter element and means defining a flux path between said meter element and coil, said meter element extending within said scanner, and means for providing relative movement between said scanner and meter element so that said areas of different reluctance continuously cut the lines of magnetic flux formed by said areas of different magnetic flux density to thereby generate a cyclic signal having a predetermined frequency, additional relative movement between said meter element and said scanner producing a phase change in said signal proportional to said movement.

References Cited by the Examiner

UNITED STATES PATENTS 2,371,511 3/1945 Faus _____ 310—104 X
2,882,516 4/1959 Neergaard _____ 310—156 X

FOREIGN PATENTS 399,949 11/1942 Italy.

ORIS L. RADER, *Primary Examiner.*
DAVID X. SLINEY, *Examiner.*